(12) United States Patent
Xu et al.

(10) Patent No.: US 11,837,692 B2
(45) Date of Patent: Dec. 5, 2023

(54) BATTERY PACK INCLUDING CELL RESTRAINT

(71) Applicant: Robert Bosch GmbH, Stuttgart (DE)

(72) Inventors: Kecheng Xu, Suzhou (CN); Alexander Foitzik, Stuttgart (DE); David Nietling, Metamora, MI (US); Henrik Wolfgang Behm, Stuttgart (DE); Klaus Spieske, Stuttgart (DE); Kyle Schultz, Oxford, MI (US); Mehul Botadra, Clawson, MI (US); Rainer Menig, Stuttgart (DE); Robert Kohler, Stuttgart (DE); Ruben Jung, Stuttgart (DE); Sinasi Temiz, Ebersbach (DE); Walter Jasch, Stuttgart (DE); Martin Kassner, Weil der Stadt (DE)

(73) Assignees: Robert Bosch Battery Systems GmbH, Stuttgart-Feuerbach (DE); Robert Bosch GmbH, Stuttgart (DE)

( * ) Notice: Subject to any disclaimer, the term of this patent is extended or adjusted under 35 U.S.C. 154(b) by 222 days.

(21) Appl. No.: 16/643,557

(22) PCT Filed: Sep. 29, 2017

(86) PCT No.: PCT/CN2017/104242
§ 371 (c)(1),
(2) Date: Feb. 29, 2020

(87) PCT Pub. No.: WO2019/061245
PCT Pub. Date: Apr. 4, 2019

(65) Prior Publication Data
US 2020/0350612 A1 Nov. 5, 2020

(51) Int. Cl.
*H01M 10/04* (2006.01)
*H01M 50/242* (2021.01)
(Continued)

(52) U.S. Cl.
CPC ..... *H01M 10/0481* (2013.01); *H01M 50/209* (2021.01); *H01M 50/242* (2021.01);
(Continued)

(58) Field of Classification Search
CPC ........... H01M 10/0481; H01M 50/209; H01M 50/242; H01M 50/264; H01M 50/289; H01M 50/291; H01M 10/0468
See application file for complete search history.

(56) References Cited

U.S. PATENT DOCUMENTS

2003/0104263 A1* 6/2003 Molter .............. H01M 10/0413
429/509
2008/0057392 A1* 3/2008 Takamatsu .......... H01M 50/224
429/154
(Continued)

FOREIGN PATENT DOCUMENTS

| CN | 102237546 | 11/2011 |
| CN | 105051935 | 11/2015 |

(Continued)

OTHER PUBLICATIONS

PCT International Search Report for PCT/CN2017/104242.

*Primary Examiner* — Matthew T Martin
*Assistant Examiner* — Jessie Walls-Murray
(74) *Attorney, Agent, or Firm* — Kelly McGlashen; Maginot, Moore & Beck LLP

(57) ABSTRACT

A battery pack (1) includes a housing (2) and an array of electrochemical cells (80) disposed in the housing (2). The housing (2) includes a container (3) and a lid (30) that closes an open end of the container (3). The container (3) has a base (4), a sidewall (8) that surrounds the base (4), and a spring plate (110) disposed inside the sidewall (8) between the cells (80) and the sidewall (8). The spring plate (110) is free standing within the container (3) and applies a spring force to the cell array that restrains the cells (80) along an axis (Continued)

normal to the surface of the spring plates (110). The lid (30) includes inwardly-protruding pins (50, 60) that further restrain the cells (80) within the housing (2).

9 Claims, 7 Drawing Sheets

(51) Int. Cl.
*H01M 50/289* (2021.01)
*H01M 50/291* (2021.01)
*H01M 50/264* (2021.01)
*H01M 50/209* (2021.01)
*H01M 50/271* (2021.01)

(52) U.S. Cl.
CPC ....... *H01M 50/264* (2021.01); *H01M 50/271* (2021.01); *H01M 50/289* (2021.01); *H01M 50/291* (2021.01); *H01M 2220/20* (2013.01)

(56) References Cited

U.S. PATENT DOCUMENTS

| | | | |
|---|---|---|---|
| 2011/0262797 A1 | 10/2011 | Kim | |
| 2014/0038029 A1* | 2/2014 | Thurmeier | H01M 50/20 429/156 |
| 2015/0340669 A1* | 11/2015 | Aoki | H01M 50/20 429/151 |
| 2017/0077545 A1* | 3/2017 | Shaffer | H01M 50/437 |
| 2017/0098855 A1 | 4/2017 | Karditsas et al. | |
| 2017/0222251 A1* | 8/2017 | Lee | H01M 10/0481 |
| 2018/0175343 A1* | 6/2018 | Choi | B60L 50/64 |
| 2019/0027797 A1* | 1/2019 | Paramasivam | H01M 10/63 |
| 2020/0091571 A1* | 3/2020 | Burgers | H01M 10/625 |
| 2020/0119320 A1* | 4/2020 | Lim | H01M 50/578 |

FOREIGN PATENT DOCUMENTS

| | | |
|---|---|---|
| CN | 105164205 | 12/2015 |
| CN | 106410101 | 2/2017 |
| CN | 107195809 | 9/2017 |
| CN | 107210404 | 9/2017 |
| CN | 107210501 | 9/2017 |
| CN | 206516686 | 9/2017 |
| CN | 206516686 U | 9/2017 |
| CN | 106486622 | 4/2021 |
| DE | 10201204375 | 9/2013 |
| EP | 2381507 | 10/2011 |
| JP | 2011228272 | 10/2011 |
| JP | 2016213104 | 12/2016 |
| KR | 1020170013005 | 2/2017 |
| KR | 1020170025491 | 3/2017 |
| KR | 1020170056306 | 5/2017 |
| WO | 2014125605 | 8/2014 |
| WO | 2017063878 | 4/2017 |

\* cited by examiner

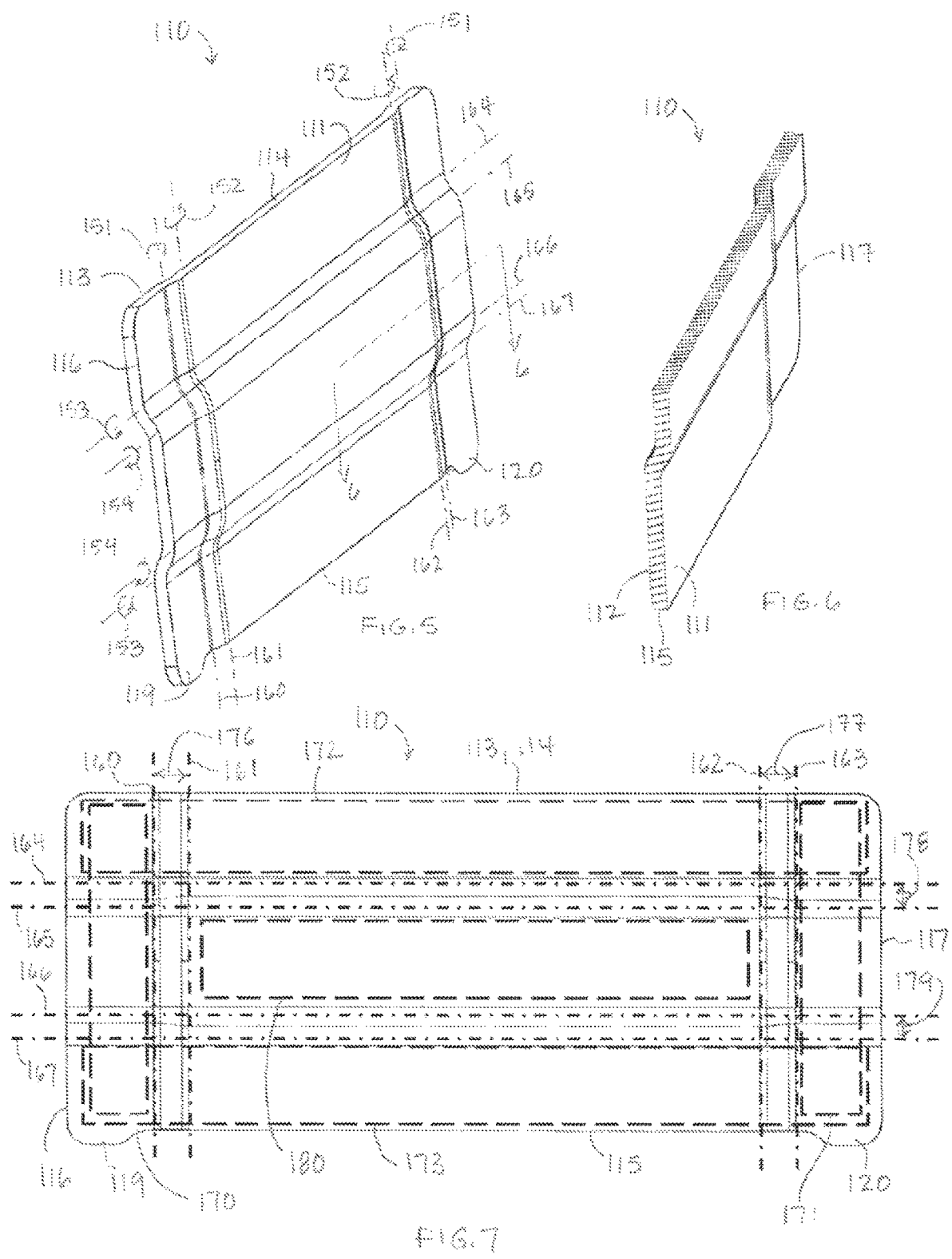

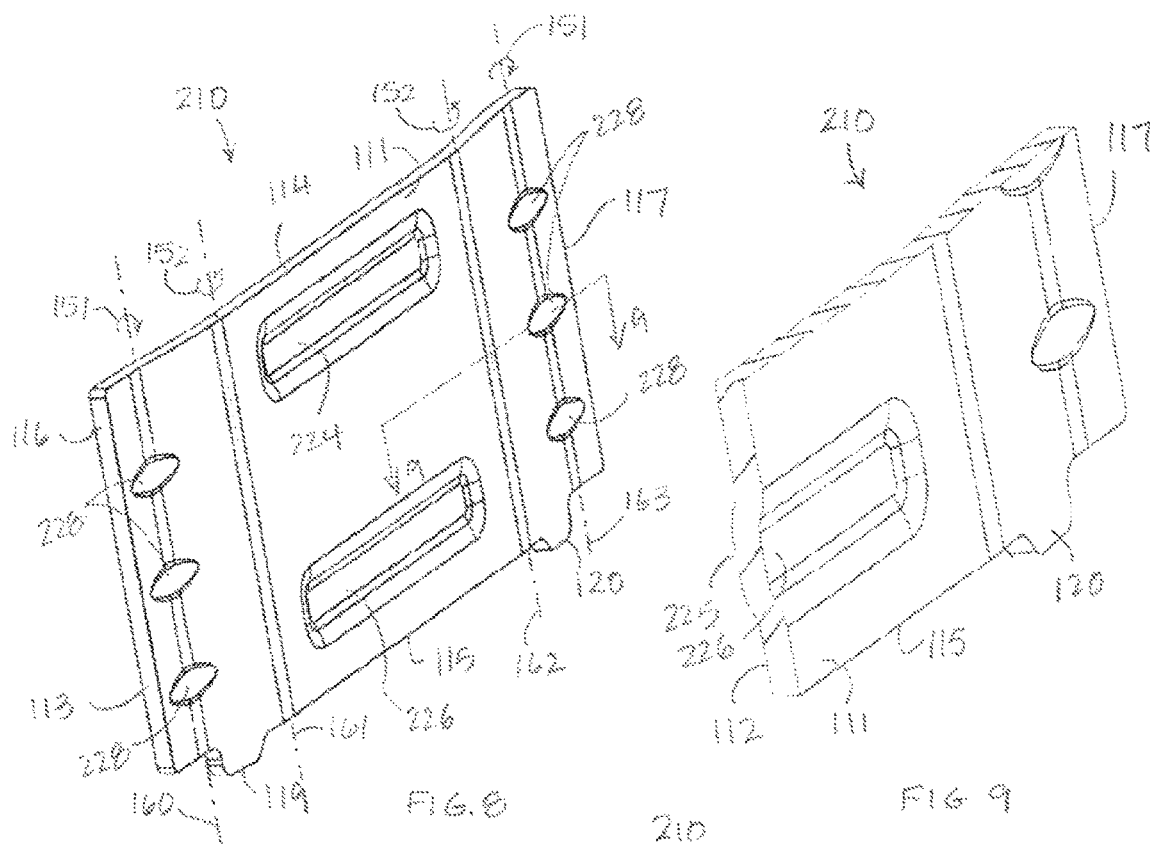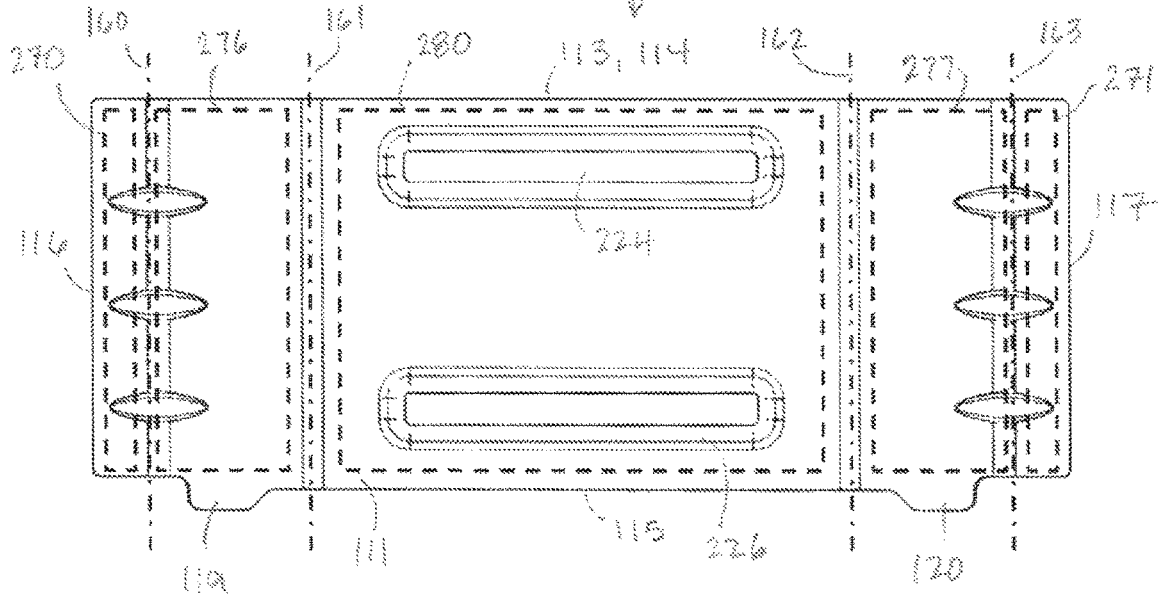

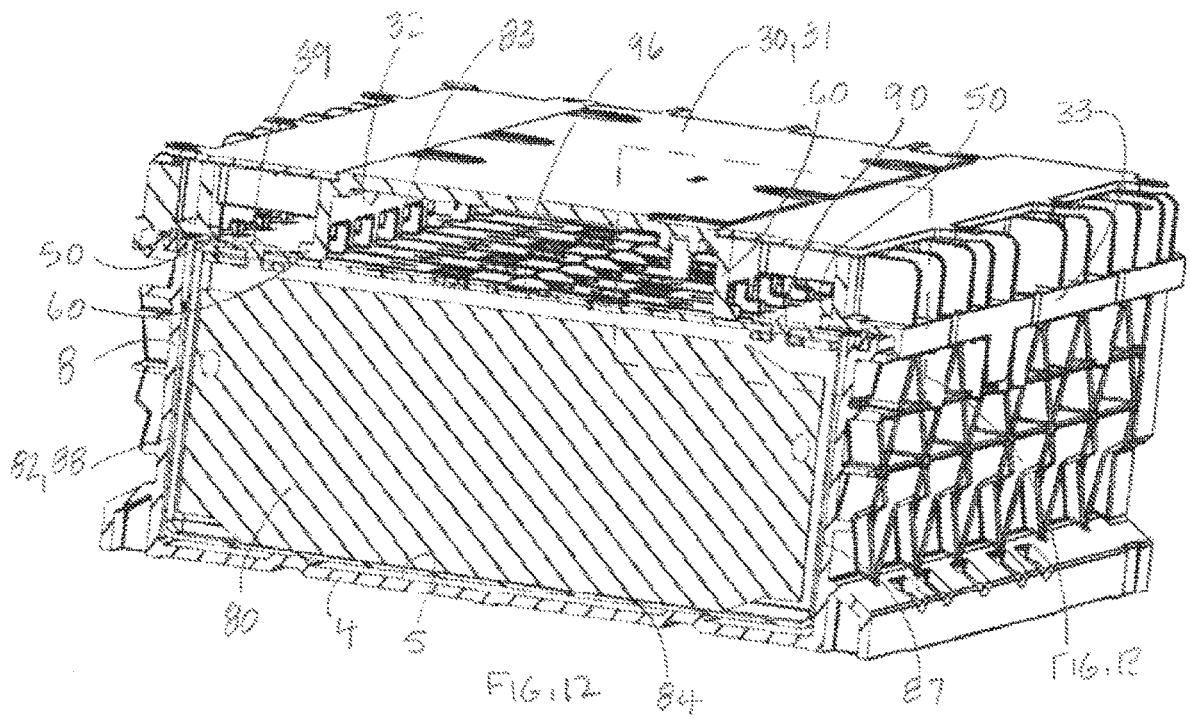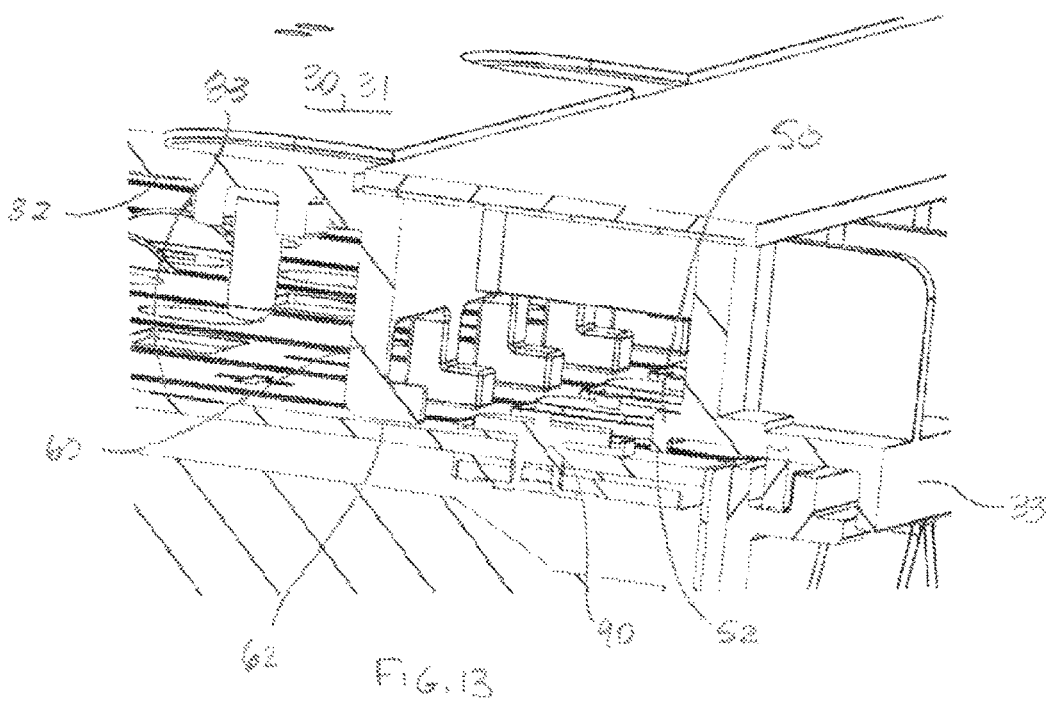

BATTERY PACK INCLUDING CELL RESTRAINT

BACKGROUND

Battery packs provide power for various technologies ranging from portable electronics to renewable power systems and environmentally friendly vehicles. For example, some hybrid electric vehicles (HEV) use a battery pack and an electric motor in conjunction with a combustion engine to increase fuel efficiency. Battery packs are formed of several electrochemical cells that are stored within a closed housing. Within the battery pack housing, the cells are arranged in two or three dimensional arrays, and are electrically connected in series or in parallel. Cell motion relative to the housing of the battery pack, for example due to external sources such as vehicle vibration or internal sources such as prismatic cell growth, can result in cell damage and/or reduced cell life. It is desirable to restrain cell motion relative to the battery pack housing so as to improve battery pack operability, reliability and longevity.

SUMMARY

In some aspects, a battery pack includes a container having a base and sidewalls the protrude from the base in a direction normal to the base. Each sidewall has a fixed end that is secured to the base and a free end opposed to the fixed end, the free ends of the sidewalls together defining an open end of the container. The battery pack includes a lid that is configured to close the open end of the container, and cells that are disposed in the container. The cells are arranged in an array that includes a single row of cells arranged side-by-side along a row axis. In addition, the battery pack includes a spring plate disposed at an end of the row of cells so as to reside between an outermost cell of the row and a corresponding sidewall of the container. The spring plate is free of attachment to the container or to the cells, and is configured to apply a spring force to the array.

In some embodiments, the spring plate includes a first surface that faces the cells, an opposed second surface that faces the container sidewall, and a thickness corresponding to the distance between the first surface and the second surface. The first surface is non-planar and the thickness of the spring plate is uniform.

In some embodiments, the second surface includes a surface protrusion, and the first surface includes a surface recess at a location corresponding to the location of the surface protrusion, the surface recess having a shape corresponding to the shape of the surface protrusion.

In some embodiments, the surface protrusion is elongated along a transverse axis that is perpendicular to the row axis and to an axis that is normal to the container base.

In some embodiments, the spring plate second surface comprises two surface protrusions that are spaced apart along the axis that is normal to the container base.

In some embodiments, the surface protrusion has a protrusion dimension in a direction that is parallel to the transverse axis, and the protrusion dimension is at least 30 percent of an overall dimension of the spring plate in a direction that is parallel to the transverse axis.

In some embodiments, the spring plate includes a first surface that faces the cells, an opposed second surface that faces the container sidewall, peripheral edges that join the first surface to the second surface, a first edge protrusion and a second edge protrusion. The first and second edge protrusions protrude in the same direction and are spaced apart along a single edge of the peripheral edges, and the spring plate is supported on the base via the first and second edge protrusions.

In some embodiments, the spring plate includes a first surface that faces the cells, an opposed second surface that faces the container sidewall, peripheral edges that join the first surface to the second surface, and a central region that is midway between an opposed pair of the peripheral edges and spaced apart from the opposed pair of the peripheral edges. In addition, portions of the first surface that include each of the opposed pair of peripheral edges are offset relative to the central region in a direction perpendicular to the first surface.

In some embodiments, a transition of the first surface between the portions of the first surface that include each of the opposed pair of peripheral edges and the central region forms an acute angle relative to the central region.

In some embodiments, the battery pack includes two spring plates, such that one spring plate is disposed at each end of the row of cells so as to reside between an outermost cell of the row and a corresponding sidewall of the container, wherein the spring plates are each configured to apply a spring force to the array.

In some embodiments, the spring plate has a first surface that faces the cells, an opposed second surface that faces the container sidewall, a peripheral edge that joins the first surface to the second surface and is parallel to the row axis. A central region of the first surface is offset from the peripheral edge along a direction that perpendicular to the first surface.

In some aspects, a spring plate is configured to be assembled with an array of cells within a battery pack housing. The spring plate includes a first surface that is configured to face an outermost cell of the array of cells, an opposed second surface that is configured to face an inner surface of the battery pack housing, and a peripheral edge that joins the first surface to the second surface. The peripheral edge includes a first edge, a second edge, a third edge and a fourth edge. The first, second, third and fourth edges each correspond to a unique side of the spring plate. The second edge is parallel to, and spaced apart from, the first edge, and the third edge is parallel to, and spaced apart from, the fourth edge. The first surface is bent in a first direction about a first bend line that is perpendicular to the first edge. The first surface is bent in a second direction about a second bend line. The second bend line is perpendicular to the first edge and spaced apart from the first bend line, and the second direction is opposed to the first direction. The first surface is bent in the second direction about a third bend line. The third bend line is perpendicular to the first edge and spaced apart from the first and second bend lines. The first surface is bent in the first direction about a fourth bend line. The fourth bend line is perpendicular to the first edge and spaced apart from the first, second and third bend lines. A first peripheral region extends between the third edge and the first bend line, a first transition region extends between the first bend line and the second bend line, a central region extends between the second bend line and the third bend line, a second transition region extends between the third bend line and the fourth bend line, and a second peripheral region extends between the fourth bend line and the fourth edge. In addition, the first peripheral region is coplanar with the second peripheral region, and the central region is parallel to the first peripheral region and offset relative to the first peripheral region.

In some embodiments, the first surface is bent in a third direction about a fifth bend line that is parallel to the first edge, and the first surface is bent in a fourth direction about a sixth bend line. The sixth bend line is parallel to the first edge and spaced apart from the fifth bend line, and the fourth direction is opposed to the third direction. The first surface is bent in the fourth direction about a seventh bend line. The seventh bend line is parallel to the first edge and spaced apart from the fifth and sixth bend lines. The first surface is bent in the third direction about an eighth bend line. The eighth bend line is parallel to the first edge and spaced apart from the fifth, sixth and seventh bend lines. A third peripheral region extends between the first edge and the fifth bend line. A third transition region extends between the fifth bend line and the sixth bend line. The central region extends between the sixth bend line and the seventh bend line. A fourth transition region extends between the seventh bend line and the eighth bend line. A fourth peripheral region extends between the eighth bend line and the second edge. The third peripheral region is coplanar with the fourth peripheral region. The central region is parallel to the third peripheral region and offset relative to the third peripheral region, and the third and fourth transition regions form an acute angle relative to the central region.

In some embodiments, the first transition region, the second transition region, the third transition region and the fourth transition region each form an acute angle relative to the central region.

In some embodiments, the spring plate includes a surface protrusion that is disposed in the central region and protrudes from the second surface, and a surface recess formed in the first surface at a location corresponding to the location of the surface protrusion. The surface recess has a shape corresponding to the shape of the surface protrusion.

In some embodiments, the surface protrusion is elongated in a direction parallel to the first edge.

In some embodiments, a thickness of the spring plate is uniform, where the thickness corresponds to the distance between the first surface and the second surface.

In some embodiments, the spring plate is configured to apply a spring force to the array.

In some embodiments, a first gusset extends between the first peripheral region and the first transition region, and a second gusset extends between the second transition region and the second peripheral region.

In some embodiments, the spring plate includes a first edge protrusion and a second edge protrusion, wherein the first edge protrusion and the second edge protrusion each protrude from the same one of one of the first, second, third and fourth edges, and are spaced apart along the same one of the first, second, third and fourth edges.

The disclosure relates to a battery pack for storage of electrochemical cells. The battery pack includes a battery pack housing having cell restraint features.

The battery pack housing includes a container and a lid that closes an open end of the container. The container is formed having a base and a sidewall that surrounds the base. An array of electrochemical cells is supported on the base and surrounded by the sidewall. The cell array includes at least one row of cells that are arranged side-by-side (e.g., "stacked") within the row.

Within the battery pack, cell stack forces should be within a particular predetermined range under all conditions. To meet this requirement, a spring plate is disposed between the outermost cells of each row and the facing sidewall. The spring plates are provided at each end of the row of the cells to ensure that the cell stack forces are in the required range, regardless of cell conditions.

In addition, the spring plates are configured to restrain motion of the cells in a direction parallel to the row axis, where cell motion is caused, for example, by vibrations due to vehicle motion. In addition, due to their flexibility in the row axis direction, the spring plates accommodate stresses due to prismatic cell growth, and reduce the amount of force transferred from the cell to the battery pack housing. Because the spring plates are non-planer (e.g., slightly bowed about an axis transverse to the row axis and normal to the base and/or including protruding regions), the prismatic cell growth is accommodated by the spring plates. This can be compared to some module housings in which the cell growth is constrained by the container sidewalls, leading to cell damage and/or reduced cell life.

Moreover, since the force resulting from cell growth is not applied to the sidewall, the sidewall is dimensionally stable. By providing a container sidewall that is dimensionally stable, a seal that is provided between the outer wall of the container and the lid is more reliable than some battery pack housings in which the sidewall may be affected by cell growth. The seal prevents particles and/or moisture from entering the interior space of the battery pack housing, whereby battery pack operability, reliability and longevity is improved.

In addition to the spring plates, the battery pack further includes other cell restraint features. In particular, the cell lid includes restraining pins that are configured to restrain the motion of the cells within the battery module housing in a direction normal to the battery pack housing base. A pair of restraining pins are provided for each end of each cell. The pair of restraining pins includes an inner pin and an outer pin, which have an unequal length since the inner pin is closer to the cell than the outer pin. In addition, the inner and outer pins have an unequal stiffness. As a result, the pins provide restraint in which the forces on the inner and outer pins, and thus on the cells, is generally equal.

BRIEF DESCRIPTION OF THE DRAWINGS

FIG. 5 is a perspective view of a spring plate.

FIG. 6 is a cross-sectional perspective view of the spring plate of FIG. 5 as seen along line 6-6 of FIG. 5.

FIG. 7 is a front plan view of the spring plate of FIG. 5 illustrating regions of the spring plate using dashed lines and illustrating bend lines using dot-dashed lines.

FIG. 8 is a perspective view of an alternative embodiment spring plate.

FIG. 9 is a cross-sectional perspective view of the spring plate of FIG. 8 as seen along line 9-9 of FIG. 8.

FIG. 10 is a front plan view of the spring plate of FIG. 8 illustrating regions of the spring plate using dashed lines and illustrating bend lines using dot-dashed lines.

FIG. 12 is a cross-sectional view of the battery pack as seen along line 12-12 of FIG. 1.

FIG. 13 is an enlarged portion of the cross-sectional view of FIG. 12.

DETAILED DESCRIPTION

Figure 1:
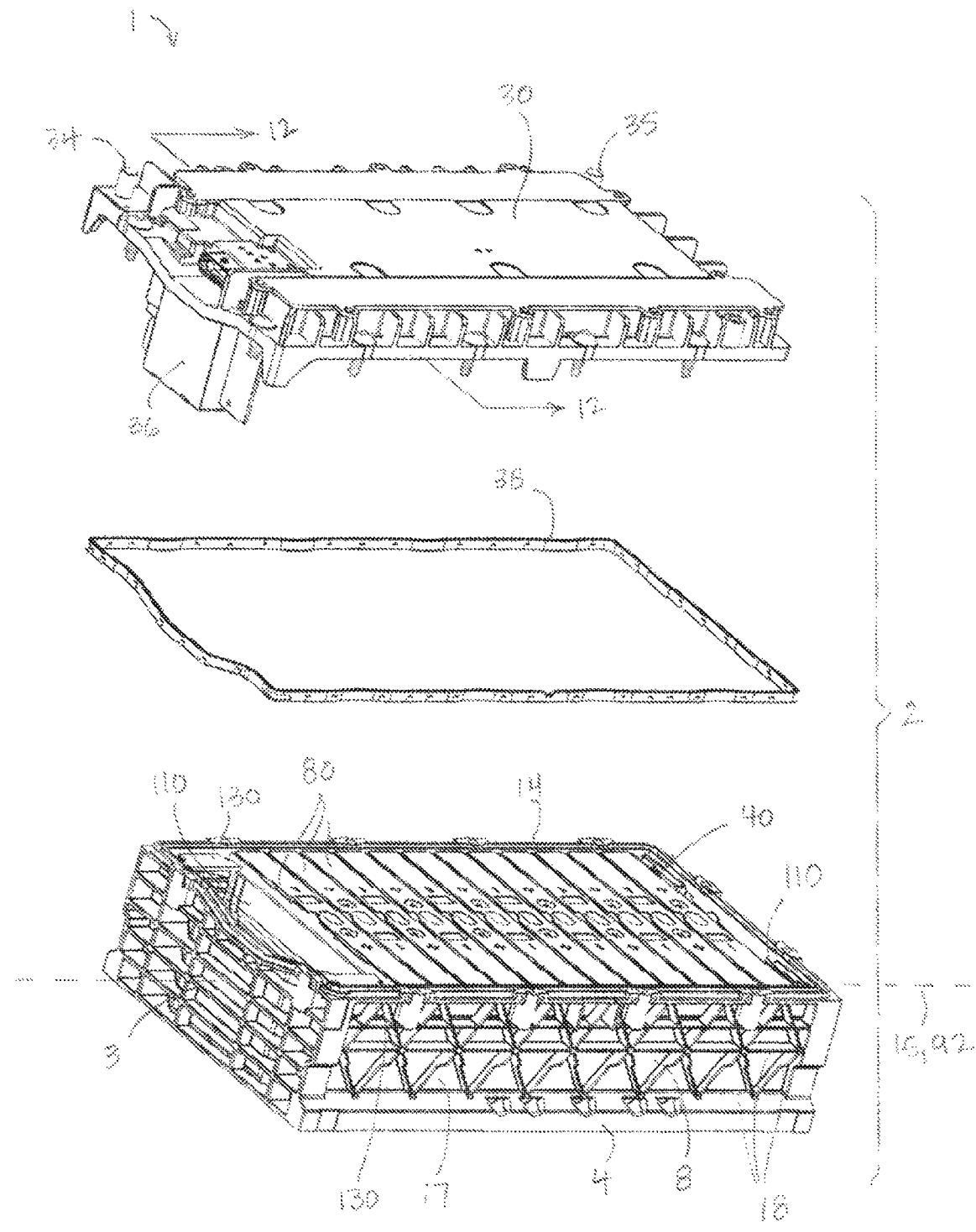
FIG. 1 is an exploded perspective view of a battery pack.
Figure 2:
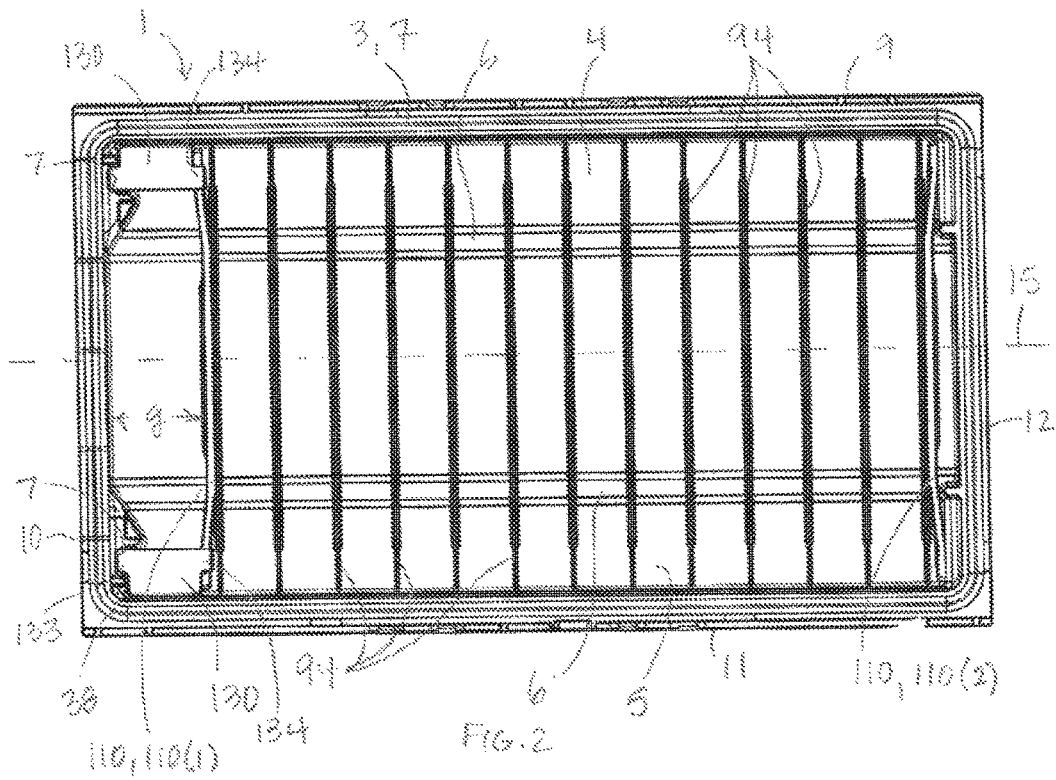
FIG. 2 is a top plan view of the battery pack with the lid, seal and cells omitted for clarity.
Figure 3:
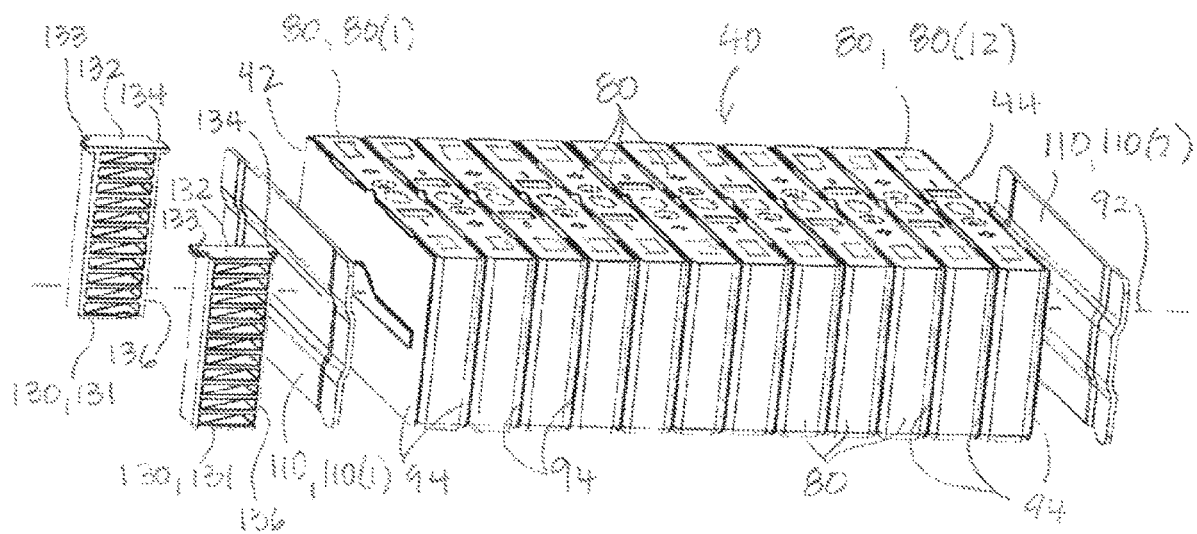
FIG. 3 is an exploded perspective view of the battery pack with the lid, container and seal omitted for clarity.

Referring to FIGS. 1-3, a battery pack 1 is a storage device that includes electrochemical cells 80 that are electrically interconnected and stored in an organized manner within a battery pack housing 2. The battery pack housing 2 includes a container 3 and a lid 30 that closes an open end of the container 3. Within the battery pack housing 2, the cells 80 are arranged in a single-row array 40, and electrically connected in series or in parallel to battery pack terminals 34, 35 that protrude from the lid 30. The battery pack 1 includes cell restraint features that control motion of the cells relative to the battery pack housing 2. The cell restraint features include spring plates 110 that are disposed between the cell array and the container 3, and restrain motion of the cells in a direction parallel to a cell stacking direction, as discussed in detail below. In addition, the cell restraint features include restraining pins 50, 60 that protrude from the battery pack housing lid 30 toward the cells 80, and restrain the motion of the cells 80 in a direction orthogonal to the cell stacking direction, as discussed in detail below.

The container 3 is a box-like structure that includes a base 4, and a sidewall 8 that surrounds a periphery of the base 4. The base 4 is rectangular. In the illustrated embodiment, the base 4 has a length dimension that is greater than its width dimension to correspond to the elongated configuration of the single-row cell array 40. A longitudinal axis 15 of the container 3 is aligned with the length dimension of the base 4. The base 4 includes an inner, or cell-facing, surface 5, and a pair of shallow rails 6 protrude inward from the inner surface 5. The rails 6 are parallel to the longitudinal axis 15, and are spaced apart along the width dimension of the base 4. The cells 80 are supported on the rails 6, and thus are slightly spaced apart from the base inner surface 5.

The sidewall 8 protrudes from the base 4 in a direction that is normal to the base inner surface 5. The sidewall 8 forms a rectangular closed section when seen in top plan view, and thus includes four orthogonal sidewall portions 9, 10, 11, 12. In particular, the sidewall 8 includes a first portion 9 that extends along the length of the base 4, a second portion 10 adjoining the first portion 9 and extending along the width of the base 4. The sidewall 8 includes a third portion 11 that adjoins the second portion 10 and is opposed to the first portion 9, and a fourth portion 12 that is opposed to the second portion 10 and joins the first portion 9 and the third portion 11. The first and third portions 9, 11 have a larger area than the second and fourth portions 10, 12, and are parallel to the container longitudinal axis 15. The outer surface 17 of the sidewall 8 includes surface features that serve to stiffen the sidewall 8, and also enhance cooling of the battery pack 1. In particular, the outer surface of the first and third portions 9, 11 includes outwardly protruding ribs 18.

The lid 30 of the battery pack housing 2 is shaped and dimensioned to close the open end of the container 3. The lid 30 includes an outward facing surface 31 and an opposed inward, or container-facing surface 32. A periphery of the lid 30 includes openings that receive fasteners, for example screws, used to secure the lid 30 to the container open end. The fasteners pass through the lid 30 and engage corresponding openings provided in bosses formed on the sidewall 8. In addition, the battery pack positive and negative terminals 34, 35 protrude from the outward-facing surface 31 of the lid 30.

In the illustrated embodiment, a battery management device is incorporated into the lid 30, and ancillary devices that are controlled by the battery management device protrude from the lid container-facing surface 32 and into the container 3 as discussed further below. The battery management device is electrically connected to each cell 80 disposed in the battery pack housing 2, and includes electronics configured to monitor and control function of the cells 80. For example, the battery management device may regulate the battery pack 1 by actively influencing the electric current flow. The ancillary device may include a printed circuit board, a resistance busbar, a relay 36, a fuse, etc.

The battery pack housing 2, including the lid 30 and the container 3, may be formed of a non-electrically conductive material. In some embodiments, the battery pack housing 2 may be formed of a material that is both electrically non-conductive and thermally conductive. For example, the battery pack housing 2 may be formed of a molded, high strength plastic with additives that improve thermal conductivity and provide electrical isolation. When used in conjunction with the ribs 18, the thermally conductive battery pack housing 60 provides passive cooling of the cells 80 during operation, whereby cell operating efficiency is improved and damage to heat sensitive components of the cell 80 is prevented.

A seal 38 is provided between a periphery of the container-facing surface 32 of the lid 30 and the free edge 14 of the container sidewall 8. The seal 38 may be a gasket or a sealing adhesive or achieved by other conventional techniques. In some embodiments where a sealing adhesive is used, the sealing adhesive permits removal of the lid 30 from the container 3, while in other embodiments the sealing adhesive provides a permanent bonding of the lid 30 to the container 3.

Figure 4:
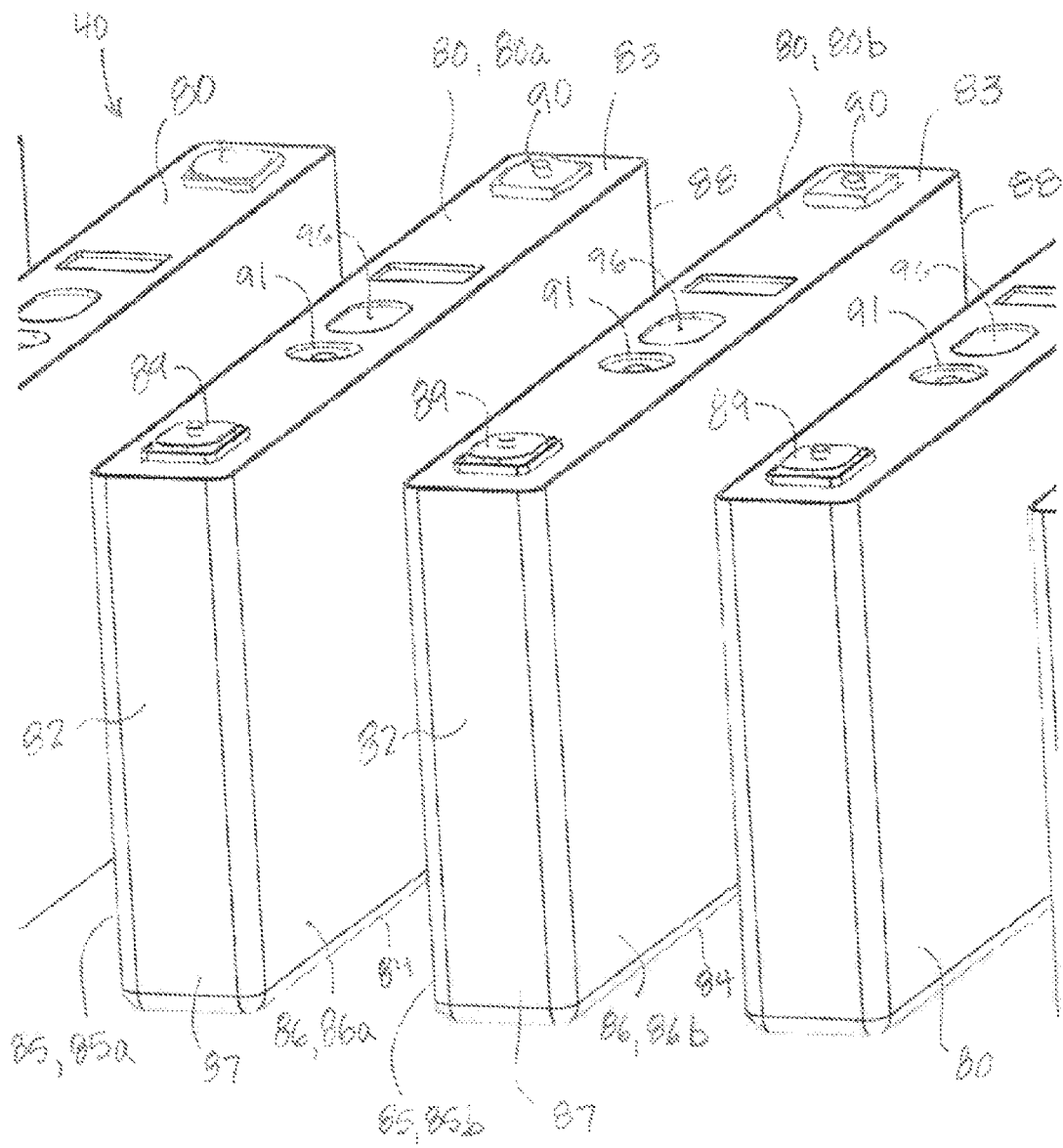
FIG. 4 is an exploded perspective view of a portion the cells of the battery pack.

Referring to FIG. 4, the cells 80 are lithium-ion cells that include a cell housing 82 that encloses an electrode assembly (not shown) and an electrolyte (not shown) to form a power generation and storage unit. The electrode assembly includes at least one positive electrode, at least one negative electrode, and an electrically insulative separator disposed between the positive and negative electrodes. In some embodiments, the positive electrode, the negative electrode and the separator may be wound into a flattened jelly roll configuration, but the electrode assembly is not limited to this arrangement. For example, in other embodiments, the positive electrode, the negative electrode and the separator may be z-folded, or provided as stacked individual sheets.

The cell housing 82 has a rectangular prism shape (e.g., prismatic), and includes a first side 85, and a second side 86 opposed to the first side 85, a third side 87 adjoining the first side 85 and the second side 86, and a fourth side 88 opposed to the third side 87 and adjoining the first side 85 and the second side 86. The first and second sides 85, 86 have the same height as the third and fourth sides 87, 88, but have a larger width. For example, in the illustrated embodiment, the width of the first and second sides 85, 86 is about twice the height, whereas the width of the third and fourth sides 87, 88 is about one-fourth of the height. In addition, the cell housing 82 includes a first end, or top plate, 83 and a second end 84 opposed to the first end 83. A positive cell terminal 89, a negative cell terminal 90, a fill opening 91, and a vent protrude through the first end 83. The electrode assembly is disposed in the cell housing 82 such that the axis about which the electrodes and separators are wound extends through the first and second ends 83, 84.

The electrode assembly experiences dimensional changes during battery charge and discharge. This is due at least in part to expansion of the layered structure of the positive and negative electrodes in the electrode thickness direction due to expansion of the active materials during cycling. The expansion of the jelly roll electrode assembly within the cell housing 82 results in "cell growth", which corresponds to the outward bowing of the first and second sides 85, 86 of the cell housing 82 in a direction transverse to the winding axis and normal to an outer surface of the first and second sides 85, 86. The battery pack housing includes features which accommodate the growth of the cells 80 disposed therein, as discussed further below.

The array 40 of cells 80 is disposed in the container 3 of the battery pack housing 2. For example, in the illustrated embodiment, the array 40 includes a single row of twelve cells 80 arranged side-by-side such that the second side 86a of one cell 80a faces the first side 85b of the adjacent cell 80b, and such that the first end 83 of each cell 80 faces the lid 30. A row axis 92 corresponding to the stacking direction of the cell array 40 is transverse to the facing surfaces (e.g., the first and second sides 85, 86) of the cells 80.

Referring again to FIGS. 1-3, the cell array 40 is arranged within the battery pack housing 2 such that the row axis 92 is parallel to the container longitudinal axis 15, and such that the first side 85 of an outermost cell 80 (1) at a first end 2 of the array 40 faces toward an inner surface of the second portion 10 of the container sidewall 8, and the second side 86 of an outermost cell 80 (12) at the opposed, second end 44 of the array 40 faces an inner surface of the fourth portion 12 of the container sidewall 8. An insulating separator plate 94 is disposed between facing surfaces of adjacent cells 80, and at each end of the cell row.

The battery pack 1 includes cell restraint features that restrain motion of the cells relative to the battery pack housing 2. In particular, the battery pack 1 includes spring plates 110 that are disposed along the row axis and are positioned between the cell array 40 and the container 3 so as to restrain motion of the cells 80 in a direction parallel to the row axis 92. The battery pack includes two spring plates 110. One of the spring plates 110 is disposed in the container 3 between the outermost cell 80 (1) at the first end of the array and the sidewall second portion 10, and the other of the spring plates 110 is disposed between the outermost cell 80 (12) at the second end of the array and the sidewall fourth portion 12. The two spring plates 110 are identical, and thus only one will be described.

Referring to FIGS. 3 and 5-7, the spring plate 110 is a thin plate that includes a first surface 111 that is configured to face the cell array 40, and an opposed second surface 112 that is configured to face an inner surface of the battery pack housing 2. The spring plate 110 includes a peripheral edge 113 that joins the first surface 111 to the second surface 112. The first and second surfaces 111, 112 have a generally rectangular profile, whereby the peripheral edge 113 includes four orthogonal edges. In particular, the peripheral edge 113 includes a first edge 114, a second edge 115, a third edge 116 and a fourth edge 117, where the first, second, third and fourth edges 114, 115, 116, 117 each correspond to a unique side of the spring plate. The second edge 115 is parallel to, and spaced apart from, the first edge 114, and the third edge 116 is parallel to, and spaced apart from, the fourth edge 117. When assembled with the cells 80 in the battery pack housing 2, the spring plate 110 is oriented so that the first and second edges 114, 115 are parallel to the housing base 4, and the third and fourth edges 116, 117 face the first and third portions 9, 11 of the housing sidewall 8.

The spring plate 110 has a uniform thickness, where the thickness of the spring plate 110 is a distance between the first and second surfaces 111, 112. In addition, the spring plate 110 is non planar in that it: includes several planar regions that are relatively offset in the thickness direction of the spring plate 110. For example, a central region 180 of the spring plate 110 is non-coplanar with respect to peripheral regions 170, 171, 172, 173 of the spring plate 110, and the transition regions 176, 177, 178, 179 between the central region 180 and the peripheral regions 170, 171, 172, 173 are acutely angled relative to the central region 180.

More specifically, the spring plate 110 is formed such that the first surface 111 is bent (e.g., angularly displaced) in a first direction 151 about a first bend line 160 that is perpendicular to the first edge 114. A first peripheral region 170 extends between the third edge 116 and the first bend line 160. The first surface 111 is bent in a second direction 152 about a second bend line 161, where the second bend line 161 is perpendicular to the first edge 114 and is spaced apart from the first bend line 160. The second direction 152 is opposed to the first direction 151. A first transition region 176 extends between the first bend line 160 and the second bend line 161. The spring plate 110 is formed such that the first surface 111 is bent in the second direction 152 about a third bend line 162 that is perpendicular to the first edge 114. The third bend line 162 is spaced apart from the second bend line 161, and disposed between the second bend line 161 and the fourth edge 117. The central region 180 is disposed between the second bend line 161 and the third bend line 162, and is parallel, and offset relative to, the first peripheral region 170. The first surface 111 is bent in the first direction 151 about a fourth bend line 163, where the fourth bend line 163 is perpendicular to the first edge 114 and is spaced apart from the first, second and third bend lines 160, 161, 162 so as to reside between the third bend line 162 and the fourth edge 117. A second transition region 177 extends between the third bend line 162 and the fourth bend line 163, and a second peripheral region 171 extends between the fourth bend line 163 and the fourth edge 117. The second peripheral region 171 is coplanar with the first peripheral region 170, and is offset relative to the central region 180.

In addition, the spring plate 110 is formed such that the first surface 111 is bent in a third direction 153 about a fifth bend line 164 that is parallel to the first edge 114. A third peripheral region 172 extends between the first edge 114 and the fifth bend line 164. The first surface 111 is bent in a fourth direction 154 about a sixth bend line 165, where the sixth bend One 165 is parallel to the first edge 114 and is spaced apart from the fifth bend line 164. The fourth direction 154 is opposed to the third direction 153. A third transition region 178 extends between the fifth bend line 164 and the sixth bend line 165. The spring plate 110 is formed such that the first surface 111 is bent in the fourth direction 154 about a seventh bend line 166 that is parallel to the first edge 114. The seventh bend line 166 is spaced apart from the sixth bend line 165, and disposed between the sixth bend line 165 and the second edge 115. The central region 180 is disposed between the sixth bend line 165 and the seventh bend line 166, and is parallel, and offset relative to, the third peripheral region 172. The first surface 111 is bent in the third direction 153 about an eighth bend line 167, where the eighth bend line 167 is parallel to the first edge 114 and is spaced apart from the fifth, sixth and seventh bend lines 164, 165, 166 so as to reside between the seventh bend line 166 and the second edge 115. A fourth transition region 177 extends between the seventh bend line 166 and the eighth bend line 167, and a fourth peripheral region 173 extends between the eighth bend line 167 and the second edge 115. The fourth peripheral region 173 is coplanar with the third peripheral region 172, and is offset relative to the central region 180.

As a result of the bent configuration, the spring plate 110 includes the central region 180 that protrudes toward the cells 80, and peripheral regions 170, 171, 172, 173 that surround the central region 180 and support the spring plate relative to the container, as discussed in more detail below.

In addition to having a contoured shape, the spring plate 110 includes a first edge protrusion 119 and a second edge protrusion 120 that protrude outward from the second edge 115. The first and second edge protrusions 119, 120 protrude in the same direction, and are spaced apart along the same edge, e.g., the second edge 115. In use, the spring plate 110 is supported on the container base 4 via the first and second edge protrusions 119, 120, which serve as spacers that allow the second edge 115 to reside above the rails 6 that protrude from the container base inner surface 5.

The battery pack 1 includes two spring plates 110(1), 110(2), such that one spring plate 110 is disposed at each end of the row of cells 80 so as to reside between an outermost cell of the row and a corresponding sidewall of the container 3, wherein the spring plates 110(1), 110(2) are each configured to apply a spring force to the array 40 in a direction parallel to the container longitudinal axis 15.

The spring plate 110(1) that is disposed at the first end 42 of the array 40 is spaced apart from the sidewall second portion 10 via a pair of spacers 130. Each spacer 130 is a rectangular block that includes a first end 131 that is supported on the base 4 and an opposed second end 132 that faces the lid 30. The spacer 130 is elongated along an axis that passes through the first and second ends 131, 132, and has a height that is approximately the same as the height of the cell 80. The spacer second end 132 is planar and includes a pair of tabs 133, 134 that reside in the plane and protrude in a direction parallel container longitudinal axis 15. A first tab 133 of the pair of tabs is configured to engage a slot 7 provided in the sidewall second portion 10, and a second tab 134 of the pair of tabs is configured to engage the first edge 114 of the spring plate 110(1) in a region corresponding to one of the first or second peripheral regions 170, 171. In addition, the first and second peripheral regions 170, 171 of the spring plate 110(1) are in direct contact with a lateral side 136 of the spacer 130, and the spacer 130 provides a gap g between the spring plate 110(1) and the sidewall second portion 10. The gap g is shaped and dimensioned to receive the relay 36 that protrudes inward from the lid 30.

The spring plate 110(2) that is disposed at the second end 44 of the array 40 confronts the fourth sidewall portion 12, and the first and second peripheral regions 170, 171 of the spring plate 110(2) are in direct contact with the sidewall fourth portion 12.

Referring to FIGS. 8-10, an alternative embodiment spring plate 210 is similar in form and identical in function to the spring plate 110 described above with respect to FIGS. 5-7. For this reason, common reference numbers are used to refer to common elements.

Like the previous embodiment, the spring plate 210 has a uniform thickness, where the thickness of the spring plate 210 is a distance between the first and second surfaces 111, 112. In addition, the spring plate 210 is non planar in that it includes several planar regions that are relatively offset in the thickness direction of the spring plate 210. For example, a central region 280 of the spring plate 210 is non-coplanar with respect to peripheral regions 270, 271 of the spring plate 210, and the transition regions 276, 277 between the central region 280 and the peripheral regions 270, 271 are acutely angled relative to the central region 280.

More specifically, the spring plate 210 is formed such that the first surface 111 is bent (e.g., angularly displaced) in a first direction 151 about a first bend line 160 that is perpendicular to the first edge 114. A first peripheral region 270 extends between the third edge 116 and the first bend line 160. The first surface 111 is bent in a second direction 152 about a second bend line 161, where the second bend line 161 is perpendicular to the first edge 114 and is spaced apart from the first bend line 160. The second direction 152 is opposed to the first direction 151. A first transition region 276 extends between the first bend line 160 and the second bend line 161. The spring plate 210 is formed such that the first surface 111 is bent in the second direction 152 about a third bend line 162 that is perpendicular to the first edge 114. The third bend line 162 is spaced apart from the second bend line 161, and disposed between the second bend line 161 and the fourth edge 117. The central region 280 is disposed between the second bend line 161 and the third bend line 162, and is parallel, and offset relative to, the first peripheral region 270. The first surface 111 is bent in the first direction 151 about a fourth bend line 163, where the fourth bend line 163 is perpendicular to the first edge 114 and is spaced apart from the first, second and third bend lines 160, 161, 162 so as to reside between the third bend line 162 and the fourth edge 117. A second transition region 277 extends between the third bend line 162 and the fourth bend line 163, and a second peripheral region 271 extends between the fourth bend line 163 and the fourth edge 117. The second peripheral region 271 is coplanar with the first peripheral region 270, and is offset relative to the central region 280.

The spring plate 210 illustrated in FIGS. 8-10 differs from the spring plate 110 of FIGS. 5-7 in that spring plate 210 illustrated in FIGS. 8-10 does not include bend lines that are parallel to the first edge 114.

In addition, the proportions of the central region 280, peripheral regions 270, 271 and transition regions 276, 277 of the spring plate 210 illustrated in FIGS. 8-10 are different than the proportions of the central region 180, corresponding peripheral regions 170, 171 and corresponding transition regions 176, 177 of the spring plate 110 of FIGS. 5-7. For example, in some embodiments, the central region 280 of the spring plate 210 has a width of about 53 percent of the overall width of the spring plate 210, where the overall width of the spring plate 210 corresponds to the distance between the third and fourth edges 116, 117. In addition, each of the peripheral regions 270, 271 of the spring plate 210 has a width of about 5 percent of the overall width of the spring plate 210, and each of the transition regions 276, 270 has a width of about 18 percent of the overall width of the spring plate 210. This can be compared to some embodiments of the spring plate 110 illustrated in FIGS. 5-7, where the central region 180 of the spring plate 110 has a width of about 72 percent of the overall width of the spring plate 110, each of the peripheral regions 170, 171 has a width of about 11 percent of the overall width of the spring plate 110, and each of the transition regions 176, 170 have a width of about 3 percent of the overall width of the spring plate 110. Further, the central region 280 of the spring plate 210 has a height of about 100 percent of the overall height of the spring plate 210, where the overall height of the spring plate 210 corresponds to the distance between the first and second edges 114, 115. This can be compared to some embodiments of the spring plate 110 illustrated in FIGS. 5-7, where the central region 180 of the spring plate 110 has a height of about 30 percent of the overall height of the spring plate 110. The above-described proportions are provided to give an example of relative proportions of the illustrated embodiments, and are not intended to be limiting.

The spring plate 210 illustrated in FIGS. 8-10 further differs from the spring plate 110 of FIGS. 5-7 in that the spring plate 210 includes surface protrusions 225 (only one is visible in the illustrations, see FIG. 9) that are disposed in the central region 280. The surface protrusions 225 protrude outward from the second surface 112 and thus protrude away from the cell array 40. Since the spring plate 210 has a uniform thickness, surface recesses 224, 226 are formed in the first surface 111 at locations corresponding to the surface protrusions 225. The surface recesses 224, 226 have a shape that corresponds to the shape of the surface protrusions 225. The surface protrusions 225 and corresponding surface recesses 224, 226 serve to increase the strength and rigidity of the spring plate 210 relative to a spring plate having no such protrusions.

In some embodiments, the spring plate 210 may include two surface protrusions 225 that are spaced apart in a direction per to the first edge 114. The surface protrusions 225 are elongated in a direction parallel to the first edge 114. Stated another way, the surface protrusions are elongated along a transverse axis that is perpendicular to the row axis 92 and to an axis that is normal to the container base 4. Each of the surface protrusions 225 has a dimension in a direction that is parallel to the transverse axis, and the surface protrusion dimension is at least 30 percent of an overall dimension of the spring plate in a direction that is parallel to the transverse axis.

The spring plate 210 illustrated in FIGS. 8-10 still further differs from the spring plate 110 of FIGS. 5-7 in that the spring plate 210 includes gussets 228 that extend between a peripheral region 270, 271 and the adjacent transition region 276, 277. For example, in the illustrated embodiment, the spring plate 210 includes three gussets 228 that extend between the first peripheral region 270 and the first transition region 276, and three gussets 228 that extend between the second transition region 277 and the second peripheral region 271. The gussets 228 are spaced apart in a direction perpendicular to the first edge 114. The gussets 228 serve to provide rigidity to the spring plate 210, maintain its non-planar profile and prevent too much deformation of the spring plate 210 in use.

Figure 11:
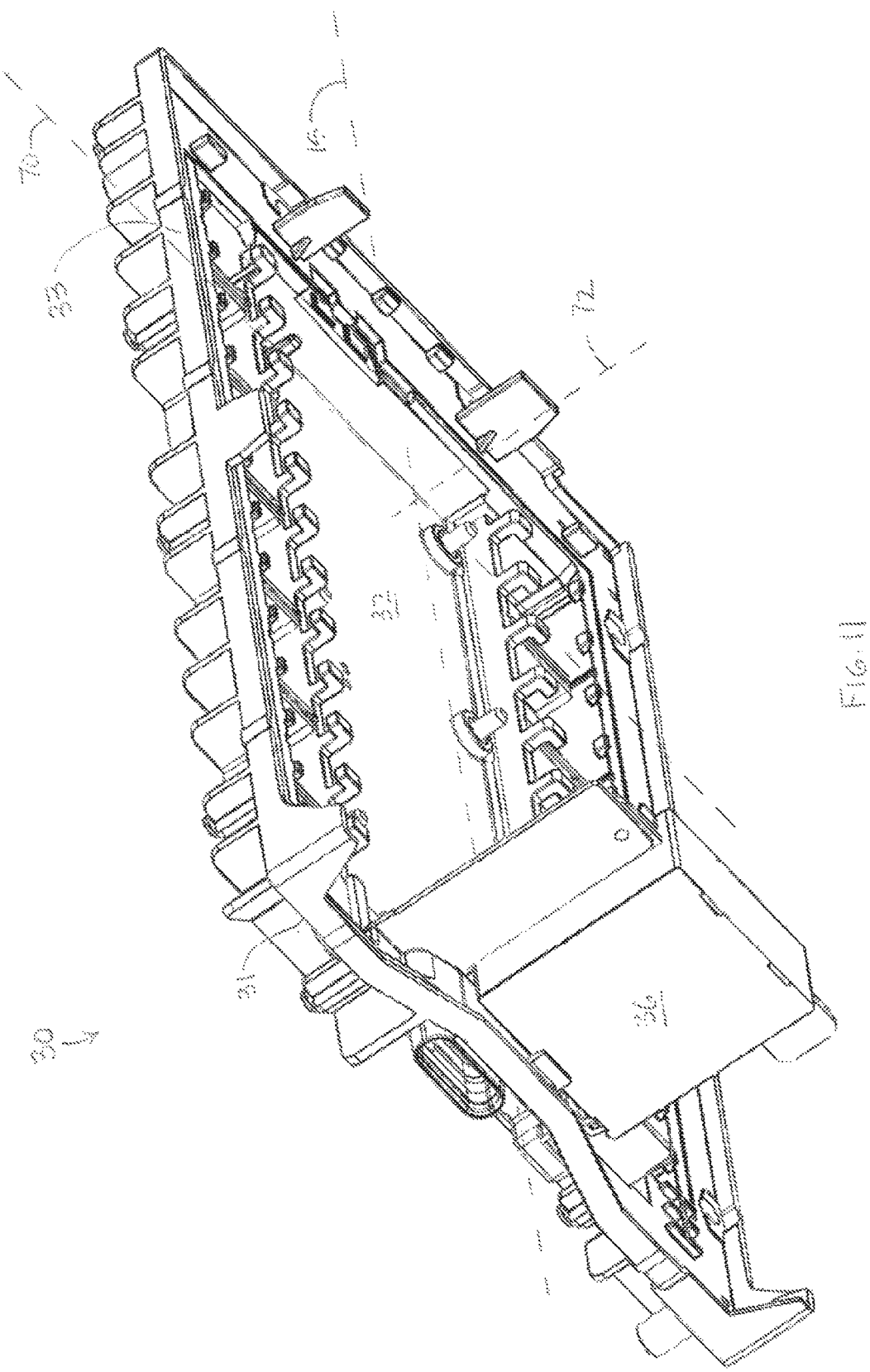
FIG. 11 is a perspective view of the lid of the battery pack.

Referring to FIGS. 11-13, in addition to the spring plates 110, 210, the battery pack 1 includes other cell restraint features that restrain motion of the cells 80 relative to the battery pack housing 2. For example, the battery pack 1 includes restraining pins 50, 60 that protrude from the battery pack housing lid 30 toward the cells 80 such that the motion each cell 80, for example due to vehicle vibration, is restrained by two pairs of restraining pins 50, 60. In particular, a pair of restraining pins 50, 60 is provided at each of opposed ends of the lid-facing surface 83 of each cell 80, in the vicinity of the cell terminals 89, 90. Each pair of restraining pins 50, 60 includes an outer pin 50 and an inner pin 60. At each of the opposed ends of the lid-facing surface 83 of a given cell 80, the inner pin 60 is disposed on one side of a terminal of the given cell 80, for example between the negative terminal 90 and a center 96 of the cell lid-facing surface 83. In the illustrated embodiment, the inner pin 60 is disposed between the fill opening 91 and the negative terminal 90. In addition, the outer pin 50 is disposed on an opposed side of the same terminal, for example between the negative terminal 90 and the end of the cell lid-facing surface 83. The outer pin 50 is not flush with the end of the cell lid-facing surface 83, rather it is disposed inboard of the weld seam that connects the lid-facing surface 83 to the cell side.

The inner and outer pins 50, 60 of a given pair of pins are aligned along a transverse axis 70 that is perpendicular to a peripheral edge 33 of the lid 30. More particularly, the transverse axis 70 is orthogonal to both the container longitudinal axis 15 and to an axis 72 that is normal to the container-facing surface 32 of the lid 30.

The inner pins 60 and the outer pins 50 may be formed integrally with the lid 30, and each restrain motion of the cell 80 in a direction perpendicular to the direction of restraint of the spring plates 110, 210. That is, the inner and outer pins 50, 60 restrain the motion of the cell 80 in a direction perpendicular to the container-facing surface 32 of the lid 30 and thus also in a direction perpendicular to the container longitudinal axis 15. To this end, the outer pin 50 and the inner pin 60 each protrude from the container-facing surface 32 in a direction normal to the container-facing surface 32, and have a distal end 52, 62 that is spaced apart from the container-facing surface 32.

It is desirable that any load applied to the cell 80 by the outer and inner pins 50, 60 is not localized and that the loads applied by the outer and inner pins 50, 60 to the cell 80 are approximately the same. As previously discussed, the peripheral edge 33 of the lid 30 is fastened to the container sidewall 8 via screws. Thus the outer pin 50, which is located closer to the lid peripheral edge 33 than the inner pin 60, is relatively more stiff in a direction normal to the lid container-facing surface 32 than the inner pin 60 since the lid 30 in the vicinity of the inner pin 60 is slightly less constrained than the lid peripheral edge 33. To avoid loading differences between the outer and inner pins 50, 60, die outer pin 50 and the inner pin 60 are formed having unequal lengths, where a length of the outer and inner pins 50, 60 corresponds to a distance of the respective distal end 52, 62 from the container-facing surface 32. In particular, the length of the outer pin 50 is less than the length of the inner pin 60, whereby the distal end 62 of inner pin 60 is closer to the lid-facing surface 83 of the cell 80 than the distal end 52 of the outer pin 50. Thus, during loading of the outer and inner pins 50, 60 such as may occur due to vehicle vibration, the inner pin 60 is loaded prior to the outer pin 50.

The distal end 62 of the inner pin 60 includes a protrusion 63 that protrudes toward the outer pin 50 along the transverse axis 70, whereby the inner pin 60 has an L shaped profile. As a result, the contact area between the inner pin distal end 62 and the cell lid-facing surface 83 is made larger than an area of a protrusion-free pin, further de-localizing force applied to the cell lid-facing surface.

In the illustrated embodiment that includes twelve cells 80 arranged in a single row array 40, twenty-four pairs of restraining pins 50, 60 are provided on the lid container-facing surface 32. Thus, the motion of each cell 80 is constrained in a direction perpendicular to the container longitudinal axis 15 by four pins 50, 60, 50, 60 that are aligned along a single axis parallel to the transverse axis 70. In addition, due to the presence of the spring plates 110, 210, the motion of each cell 80 is constrained in a direction parallel to the container longitudinal axis. As a result, the reliability and longevity of the cells 80 within the battery pack 1 are improved.

Although the cells 80 are described as housing the electrode assembly 4 having a jelly roll electrode configuration, the electrode assembly 4 is not limited to this electrode configuration. For example, the electrode assembly 4 may include a stacked or folded arrangement of electrode plates, or other suitable electrode arrangement.

Although the cells 80 are described as being lithium ion cells, the cells 80 are not limited to this type of cell. For example, the cells 80 may include different combinations of electrode materials and electrolytes, including lead-acid, nickel cadmium (NiCd), nickel metal hydride (NOAH), and lithium ion polymer.

Although the illustrated embodiment includes a single-row cell array 40 that includes twelve cells 80, the battery pack 1 is not limited to having twelve cells 80. The number of cells used may be greater or fewer than twelve, and is determined by the requirements of the specific application.

Although the illustrated embodiment includes a single-row cell array 40, the battery pack 1 is not limited to including a single-row array 40. For example, in other embodiments, the array may include cells 80 arranged in multiple rows and columns, and further may include a three dimensional array of cells. In such other embodiments, the battery pack housing 2 is shaped and dimensioned to accommodate the cell array.

Although the battery pack 1 is described as including two spring plates 110, one at each end of the row of cells 80, the battery pack is not limited to this arrangement. For example, in some embodiments, the battery pack 1 includes a single spring plate 110.

Although the battery pack 1 described herein includes spacers 130 to create a gap g between the container sidewall 8 and the cell array 40 to accommodate electronics that are mounted on the lid inner surface, it is contemplated that the gap g, and thus also the spacers 130, may be eliminated in some embodiments, for example in embodiments in which the electronics are stored externally.

Although the illustrated spring plates 110, 210 include edge protrusions 119, 120 that allow the spring plates 110, 210 to reside above the rails 6 that protrude from the container base 4, the spring plates 110, 210 may be formed without the edge protrusions 119, 120, In embodiments in which the edge protrusions are omitted, the spring plates 110, 210 have a linear second edge 115 that rests on the rails 6 when in use.

Selective illustrative embodiments of the battery pack and battery pack housing are described above in some detail. It should be understood that only structures considered necessary for clarifying these devices have been described herein. Other conventional structures, and those of ancillary and auxiliary components of the battery pack system, are assumed to be known, and understood by those skilled in the art. Moreover, while working examples of the battery pack and battery pack housing been described above, the battery pack and/or battery pack housing is not limited to the working examples described above, but various design alterations may be carried out without departing from the devices as set forth in the claims.

What is claimed is:

1. A spring plate configured to be assembled with an array of cells within a battery pack housing, the spring plate comprising
a first surface that is configured to face an outermost cell of the array of cells,
an opposed second surface that is configured to face an inner surface of the battery pack housing, and
a peripheral edge that joins the first surface to the second surface, the peripheral edge including a first edge, a second edge, a third edge and a fourth edge, the first, second, third and fourth edges each corresponding to a unique side of the spring plate, the second edge being parallel to, and spaced apart from, the first edge, and the third edge being parallel to, and spaced apart from, the fourth edge,
wherein
a distance between the first edge and the second edge corresponds to height dimension of the spring plate,
a distance between the third edge and the fourth edge corresponds to a width dimension of the spring plate, the width dimension of the spring plate is equal to or greater than the height dimension of the spring plate,
the first surface is bent in a first direction about a first bend line that is perpendicular to the first edge,
the first surface is bent in a second direction about a second bend line, the second bend line being perpendicular to the first edge and spaced apart from the first bend line, the second direction being opposed to the first direction,
the first surface is bent in the second direction about a third bend line, the third bend line being perpendicular to the first edge and spaced apart from the first and second bend lines,
the first surface is bent in the first direction about a fourth bend line, the fourth bend line being perpendicular to the first edge and spaced apart from the first, second and third bend lines,
a first peripheral region extends between the third edge and the first bend line,
a first transition region extends between the first bend line and the second bend line,
a central region extends between the second bend line and the third bend line,
a second transition region extends between the third bend line and the fourth bend line,
a second peripheral region extends between the fourth bend line and the fourth edge,
the first peripheral region is coplanar with the second peripheral region,
the central region is parallel to the first peripheral region and offset relative to the first peripheral region,
a width of the first peripheral region is at least three times a width of the first transition region,
a width of the second peripheral region is at least three times a width of the second transition region, and
a width of the central region is at least three times the width of the first peripheral region and at least three times the width of the second peripheral region.

2. The spring plate of claim 1, wherein
the first surface is bent in a third direction about a fifth bend line that is parallel to the first edge,
the first surface is bent in a fourth direction about a sixth bend line, the sixth bend line being parallel to the first edge and spaced apart from the fifth bend line, the fourth direction being opposed to the third direction,
the first surface is bent in the fourth direction about a seventh bend line, the seventh bend line being parallel to the first edge and spaced apart from the fifth and sixth bend lines,
the first surface is bent in the third direction about an eighth bend line, the eighth bend line being parallel to the first edge and spaced apart from the fifth, sixth and seventh bend lines,
a third peripheral region extends between the first edge and the fifth bend line,
a third transition region extends between the fifth bend line and the sixth bend line,
the central region extends between the sixth bend line and the seventh bend line,
a fourth transition region extends between the seventh bend line and the eighth bend line,
a fourth peripheral region extends between the eighth bend line and the second edge,
the third peripheral region is coplanar with the fourth peripheral region,
the central region is parallel to the third peripheral region and offset relative to the third peripheral region, and the third transition region forms a first acute angle relative to the central region, and the fourth transition region forms a second acute angle relative to the central region.

3. The spring plate of claim 2, wherein the first transition region forms a third acute angle relative to the central region, and the second transition region forms a fourth acute angle relative to the central region.

4. The spring plate of claim 1, comprising a surface protrusion that is disposed in the central region and protrudes from the second surface, and a surface recess formed in the first surface at a location corresponding to the location of the surface protrusion, the surface recess having a shape corresponding to the shape of the surface protrusion.

5. The spring plate of claim 4, wherein the surface protrusion is elongated in a direction parallel to the first edge.

6. The spring plate of claim 1, wherein a thickness of the spring plate is uniform, where the thickness corresponds to the distance between the first surface and the second surface.

7. The spring plate of claim 1, wherein the spring plate is configured to apply a spring force to the array.

8. The spring plate of claim 1, wherein a first gusset extends between the first peripheral region and the first transition region, and a second gusset extends between the second transition region and the second peripheral region.

9. The spring plate of claim 1, comprising a first edge protrusion and a second edge protrusion, wherein the first edge protrusion and the second edge protrusion each protrude from the same one of one of the first, second, third and fourth edges, and are spaced apart along the same one of the first, second, third and fourth edges, and wherein an edge that is opposed to the same one of one of the first, second, third and fourth edges is free of protrusions.

* * * * *